United States Patent [19]

Kalal et al.

[11] Patent Number: 4,878,143
[45] Date of Patent: Oct. 31, 1989

[54] LINE CURRENT TO TIME INTERPOLATOR

[75] Inventors: Theodore T. Kalal, Wauwatosa, Wis.; Richard Kowitch, Chicago, Ill.

[73] Assignee: Cooper Power Systems, Inc., Houston, Tex.

[21] Appl. No.: 115,530

[22] Filed: Oct. 30, 1987

[51] Int. Cl.[4] ............................................. H02H 3/093
[52] U.S. Cl. ......................................... 361/94; 361/87; 361/76; 307/597; 323/213
[58] Field of Search ......................... 361/63, 76, 80, 85, 361/87, 93, 94, 96, 97, 98; 307/592, 597; 323/212, 213, 217

[56] References Cited

U.S. PATENT DOCUMENTS

| | | | |
|---|---|---|---|
| 3,105,920 | 10/1963 | Dewey | 361/98 |
| 3,970,899 | 7/1976 | Davis | 361/96 |
| 4,152,744 | 5/1979 | Pang | 361/98 X |
| 4,386,384 | 5/1983 | Moran | 361/96 X |
| 4,636,909 | 1/1987 | Brandt | 361/80 |

Primary Examiner—Derek S. Jennings
Attorney, Agent, or Firm—Nelson A. Blish; Eddie E. Scott; Alan R. Thiele

[57] ABSTRACT

A line current to time interpolator circuit senses the magnitude of current in a power distribution line and develops and AC voltage indicative of the current magnitude. The AC voltage is phase shifted multiple times to produce a number of phase shifted replica AC voltages, and the replica voltages are applied to a multiple input absolute value amplifier to develop a DC voltage indicative of the current magnitude. The DC voltage is applied to a ladder voltage comparator which controls the overall resistance of a discharge path coupled to a charged capacitor. The ladder comparator varies the discharge path resistance in inverse relationship to the DC voltage level to vary the discharge time constant of the capacitor. By controlling operation of a circuit interrupter in accordance with the charge level of the capacitor, the interpolator circuit provides a desired inverse time-current response characteristic.

18 Claims, 3 Drawing Sheets

LINE CURRENT TO TIME INTERPOLATOR

BACKGROUND OF THE INVENTION

This invention relates generally to electrical control devices for opening an electrical circuit in response to an abnormal overcurrent condition, and, in particular, to such devices that delay opening the electrical circuit for a time period which is inversely related to the magnitude of the overcurrent condition.

Various known protective devices exist for opening an electrical circuit in the event of an abnormal fault or overcurrent condition, i.e., a condition in which current through a conductor exceeds a predetermined maximum threshold value. In electrical power distribution systems, momentary overcurrents of small to moderate magnitude are frequent and can result, for example, from a tree branch swaying into and out of contact with a power line. Because small to moderate overcurrents of short duration pose no immediate threat to the well-being of the electrical power distribution system, it is desirable that protective devices used in such distribution systems exhibit inverse time-current response characteristics, i.e., provide delayed response to overcurrents of small magnitude and rapid response to overcurrents of large magnitude. The use of protective devices exhibiting such response characteristics avoids the inconvenience of service interruptions resulting from momentary overcurrents which pose no immediate threat to the system, while assuring that large overcurrents will be interrupted before damage to the power distribution system can occur.

Known electro-mechanical protective devices, such as fuses, circuit reclosers and circuit breakers, respond to the physical heating of a conductor and, thus, inherently provide the desired inverse time-current response characteristic. However, such electro-mechanical protective devices as circuit breakers and circuit reclosers are subject to the wear and maintenance problems which plague all mechanical devices. Fuses, which cannot be reset and which must be replaced when blown, can give rise to inconvenience and expense. Although purely electronic systems for sensing overcurrent conditions avoid the practical difficulties associated with electro-mechanical devices, such electronic systems do not inherently provide the desired inverse time-current response characteristic—such a characteristic must be designed into the system.

To minimize the extent of a service interruption in the event of a persisting overcurrent condition, it is a known practice to install protective devices so that devices having relatively faster response characteristics are positioned farther downstream from the power station than are devices having relatively slower response characteristics. This helps assure that only the protective device nearest a fault opens and thus helps avoid terminating service to branches unaffected by the fault. Because electro-mechanical devices continue to find service in power distribution systems, particularly at the higher current levels, it is desirable that electronic systems for sensing overcurrent conditions be capable of approximating the inverse time-current response characteristics of such electro-mechanical devices and that some provision be made for tailoring the response of the electronic system so as to obtain a response which is appropriate in view of the intended location of the electronic system within the power distribution system.

One electronic system for providing an inverse time-current response is shown in U.S. Pat. No. 3,105,920 which issued Sept. 15, 1961 to Dewey and discloses a protective device wherein the rate at which a capacitor charges is varied so as to provide the desired inverse time-current response.

Another such system is shown in U.S. Pat. No. 3,944,890 which issued Mar. 16, 1976 to Little on a static overcurrent relay.

Still another such system is shown in U.S. Pat. No. 4,571,658 which issued Feb. 18, 1986 to Ruta on a control circuit for a circuit interrupter.

Attention is also directed to the following U.S. Patents:

| U.S. Pat. No. | Inventor | Issue Date |
| --- | --- | --- |
| 3,976,919 | Vandevier et al. | August 24, 1976 |
| 4,315,296 | Hancock | February 9, 1982 |
| 3,397,323 | Hirsch | August 13, 1968 |
| 3,970,899 | Davis | July 20, 1976 |
| 4,386,384 | Moran | May 31, 1983 |
| 3,808,466 | Campbell | April 30, 1974 |
| 3,840,813 | Allen et al. | October 8, 1974 |
| 3,530,365 | Peugh | September 22, 1970 |
| 3,760,255 | Grodinsky | September 18, 1973 |
| 4,647,861 | Petritis et al. | March 3, 1987 |

SUMMARY OF THE INVENTION

The invention provides an interpolator circuit that senses an overcurrent condition in a conductor of a power distribution system and develops, after a delay period having a duration inversely related to the magnitude of the overcurrent condition, a control effect in response to the overcurrent condition. The interpolator circuit includes sensing means, responsive to the magnitude of current in a conductor of a power distribution system, for developing an AC sense voltage indicative of the magnitude of current in the conductor. Also included are phase shifter means, for developing a plurality of replica AC voltages which are similar to the applied AC voltage and different in phase from one another, and absolute value amplifier means coupled from the phase shifter means for developing an output voltage substantially proportional to the magnitude of the one of the replica AC voltages having greatest magnitude at any instant. The interpolator circuit includes a source of reference potential and a capacitor adapted to be charged from the source of reference potential. Enabling means, responsive to the magnitude of the output voltage, is provided for terminating charging of the capacitor from the source of reference potential when the output voltage exceeds a predetermined threshold potential, and comparator means, responsive to the magnitude of the output voltage, is provided for providing a discharge path operable to discharge the capacitor and for varying the resistance of the discharge path in inverse relationship to the magnitude of the output voltage so as to vary the rate of discharge of the capacitor in inverse relationship to the magnitude of the output voltage. Generator means, responsive to the degree of charge of the capacitor, is included for providing a control effect when the degree of charge of the capacitor falls below a predetermined threshold.

The invention also provides a high speed converter circuit for developing a DC voltage indicative of the magnitude of an applied AC voltage. The converter circuit comprises phase shifter means for developing a plurality of replica AC voltages similar to the applied AC voltage and differing in phase from one another, and further comprises absolute value amplifier means coupled to the phase shifter means for developing an output voltage substantially proportional to the magnitude of the one of the replica AC voltages having greatest magnitude at any instant.

The invention also provides a control circuit for providing a control effect after a period of delay having a duration inversely related to the magnitude of an applied voltage. The control circuit comprises a source of reference potential, a capacitor adapted to be charged from the source of reference potential, and enabling means responsive to the magnitude of the applied voltage for terminating charging of the capacitor from the source of reference potential when the applied voltage exceeds a predetermined enabling threshold potential. The control circuit further comprises comparator means responsive to the magnitude of the applied voltage for providing a discharge path operable to discharge the capacitor and for varying the resistance of the discharge path in inverse relationship to the magnitude to the applied voltage so as to vary the rate of discharge of the capacitor in inverse relationship to the magnitude of the applied voltage. The control circuit still further comprises generator means responsive to the degree of charge of the capacitor for developing a control effect when the degree of charge of the capacitor falls below a predetermined threshold.

In one embodiment, the phase difference between successive ones of the replica AC voltages is substantially constant.

In one embodiment, one of the replica AC voltages is substantially in phase with the applied AC voltage.

In one embodiment, one of the replica AC voltages is substantially 180° out of phase with the applied AC voltage.

In one embodiment, the phase shifter means provides five of the replica AC voltages, and successive ones of the five replica AC voltages differ in phase from each other by substantially 30°.

In one embodiment, the phase shifter includes inverter means for inverting one or more of the replica AC voltages to develop additional replica AC voltages similar to the applied AC voltage and differing in phase from one another.

In one embodiment, the phase difference between successive ones of the replica AC voltages and the additional replica AC voltages is substantially constant.

A principal feature of the invention is the provision of an interpolator circuit responsive to overcurrent conditions in a conductor of a power distribution system wherein the interpolator circuit actuates a circuit interrupter after a delay period having a duration inversely related to the magnitude of the overcurrent condition. To achieve such desired inverse time-current response characteristics, the interpolator circuit includes a high speed converter circuit wherein an AC signal, indicative of the magnitude of line current in the power distribution system, is phase shifted multiple times and then applied to a multiple input absolute value amplifier. The absolute value amplifier converts the multiple, phase shifted, AC voltages to a substantially DC voltage. Unlike conventional filters employing large, discrete capacitors and inductors, the absolute value amplifier provides a substantially DC voltage which responds substantially instantaneously to changes in the sensed line current. This helps ensure rapid actuation of a circuit interrupter in the event of a large magnitude overcurrent condition.

Another principal feature of the invention is the provision of an interpolator circuit wherein the current-indicative DC voltage provided by the absolute value amplifier is applied to a ladder voltage comparator which selectively varies the discharge time constant of a capacitor-resistor network in inverse relationship to the magnitude of the DC voltage. By so varying the discharge time constant, and by generating a control effect when the capacitor discharges to a predetermined charge level, a desired inverse time-current response characteristic can be obtained. By selection of suitable resistors, the inverse time-current relationship thus provided can be tailored to suit particular applications. By varying the reference voltages of the ladder comparator, interpolation between the reference voltage levels of the individual comparators can be achieved.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

DESCRIPTION OF A PREFERRED EMBODIMENT

Figure 1:
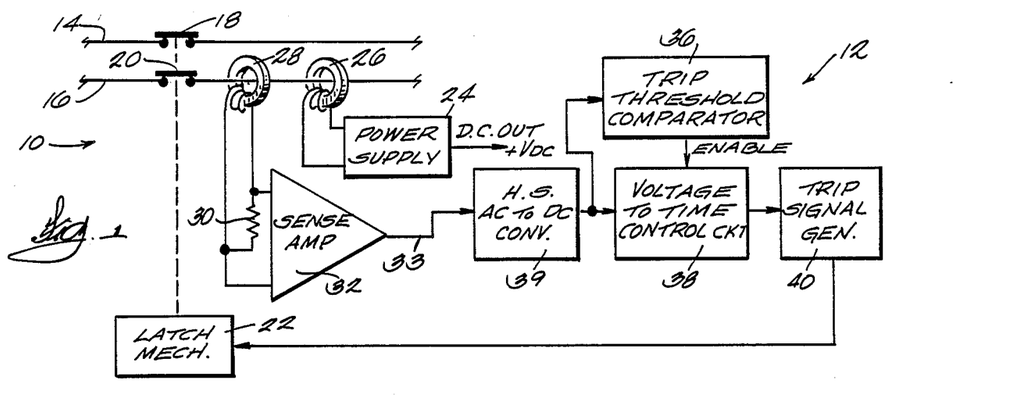
FIG. 1 is a simplified functional block diagram of a power distribution system including a line current to time interpolator embodying various of the features of the invention.

Referring to the drawings, and in particular to FIG. 1, a power distribution system 10, having a line current to time interpolator 12 embodying various of the features of the invention, is illustrated. As shown, the power distribution system 10 includes at least a pair of individual conductors 14 and 16 through which electrical current is conveyed from a power station (not shown) to electrical service customers. In accordance with known practice, each of the conductors 14 and 16 is provided with a circuit interrupter 18 and 20 which is normally held closed by a latch mechanism 22 and which can be opened in the event of an abnormal overcurrent condition to interrupt current flow through the conductors 14 and 16 and thereby avoid potential damage to the power distribution system 10.

The line current to time interpolator 12 illustrated in FIG. 1 functions, broadly, to sense the current magnitude in one or more lines 14 or 16 of the power distribution system 10 and to provide a control effect, such as actuation of the circuit interrupters 18 and 20, in the event line current in the conductor 14 or 16 exceeds a predetermined maximum or trip current level. In particular, the line current to time interpolator 12 functions to control actuation of the circuit interrupters 18 and 20 so that the time between the initial sensing of an over-current condition and the opening of the circuit interrupters varies as an inverse function of the current by which the sensed line current exceeds the trip current level. In addition, the line current to time interpolator 12 provides the capability of tailoring the inverse time-current response characteristic so as to match that of a fuse or circuit recloser.

As illustrated, power for operating the line current to time interpolator 12 is provided by means of a regulated DC power supply 24 which is coupled through a torroidal current transformer 26 to one of the power distribution lines 16. Line current through the line 16 induces a sinusoidal current in the secondary of the current transformer 26, and the sinusoidal current thus induced is rectified, filtered and regulated by known conventional circuitry within the power supply 24 to provide a regulated DC output or supply voltage $+V_{DC}$.

A second or sense current transformer 28, positioned around the power distribution line 16, senses the magnitude of the line current carried by the conductor 16. A resistance 30 is connected across the secondary of the current transformer 28, and a sinusoidal AC voltage or input signal, proportional to the magnitude of the current carried by the conductor 16, is developed across the resistance 30. The AC voltage thus developed is applied to the input of a sense amplifier 32 which functions as a buffer and which provides protection from transient voltage spikes. The sense amplifier 32 preferably provides some gain so that the signal appearing at its output 33 is somewhat larger than the input signal provided by the sense current transformer 28.

The output of the sense amplifier 32 is applied to a high speed converter circuit 34, constructed in accordance with one aspect of the invention, which, in turn, develops a substantially DC voltage at its output having a magnitude substantially proportional to the magnitude of the AC signal applied to its input. Preferably, the DC output voltage provided by the high speed converter 34 is substantially equal to the peak voltage of the AC input signal. To avoid potential damage to the power distribution system 10 in the event the magnitude of an overcurrent in the distribution line 16 is extremely large (e.g., 12,000 amperes in a 400 amp. line), the high speed converter 34, in accordance with one aspect of the invention, operates so that a change in sensed line current is reflected by a substantially instantaneous change in the DC output voltage level.

The DC output voltage developed by the converter circuit 34 is next applied to a trip threshold comparator 36 which is responsive to the magnitude of the DC output voltage and which functions to enable additional circuitry within the line current to time interpolator 12 when the output voltage of the high speed converter 34 exceeds a predetermined minimum threshold voltage level. Preferably, the minimum threshold voltage level is substantially equal to an output voltage level which corresponds to a line current level equal to the desired minimum trip current level.

The DC output voltage of the high speed converter 34 is also applied to the input of a voltage to time control circuit 38 which functions as an inverse voltage to time converter and which is enabled by the trip threshold comparator 36 when the sensed line current equals or exceeds the desired trip current level. In particular, the control circuit 38 functions to establish a delay period having a duration inversely related to the magnitude of the applied DC voltage.

The control circuit 38 is coupled to a trip signal generator 40 which, at the end of the delay period established by the control circuit 38, provides a trip signal to the latch mechanism 22 to actuate the circuit interrupters 18 and 20 and thereby interrupt current through the power distribution lines 14 and 16. When the overcurrent magnitude is large, the DC output of the high speed converter circuit 34 will be relatively higher and the delay period established by the control circuit will be relatively shorter. Thus, with large overcurrents, the time between the initial occurrence of the overcurrent and the opening of the circuit interrupters 18 and 20 will be relatively short. When the overcurrent magnitude is relatively small, the DC output voltage of the converter 34 will be relatively lower, the delay period of the control circuit 34 will be relatively longer, and a relatively longer time will elapse between the occurrence of the overcurrent condition and the opening of the circuit interrupters 18 and 20. If the overcurrent condition terminates before the delay period elapses, such as might be the case when a tree branch contacts the line 16 only momentarily, the circuit interrupters 18 and 20 remain closed and no interruption of electrical service occurs.

In accordance with one aspect of the invention, the inverse-time current relationship provided by the control circuit 38 can be tailored to achieve a number of selected response characteristics. Thus, the line current to time interpolator 12 can be constructed so as to duplicate, for example, the response characteristics of a fuse or a circuit recloser. In addition, the line current to time interpolator 12 can be constructed so as to provide a response characteristic which is best suited for that of protective devices located nearer the power station and alternately more suited for that of protective devices which are located farther down line.

Figure 2:
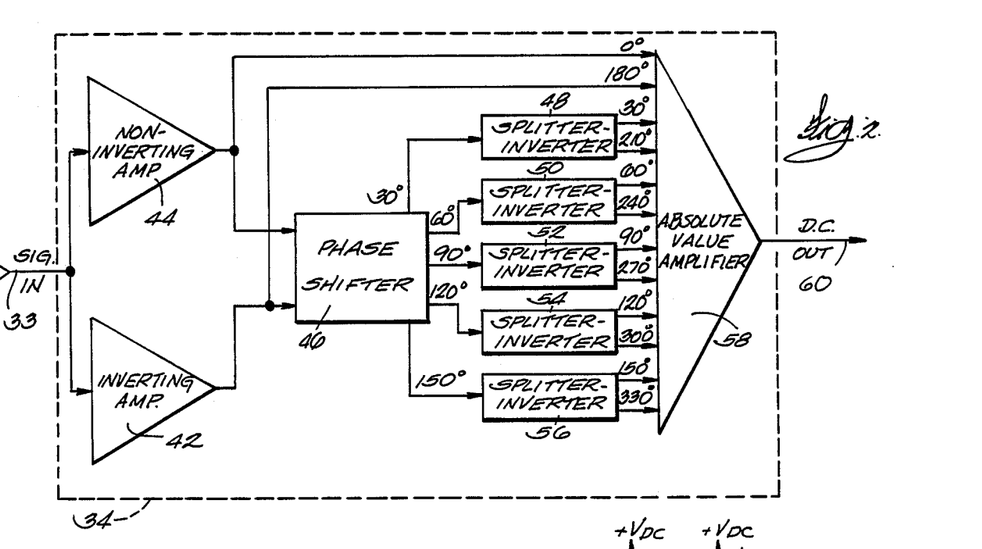
FIG. 2 is a simplified functional block diagram of a high speed AC to DC converter as utilized in the line current to time interpolator shown in FIG. 1.

The operation of the high speed converter 34 can best be understood by reference to the functional block diagram of FIG. 2. As illustrated, the output signal 33 from the sense amplifier 32 is first applied to the inputs of a pair of unity gain inverting and non-inverting amplifiers 42 and 44. The output of the non-inverting amplifier 44 is substantially equal in magnitude and phase to the output of the sense amplifier 32, and the output of the inverting amplifier 42 is substantially equal in magnitude, but 180° out of phase, with the output of the sense amplifier 32.

The outputs of the inverting and non-inverting amplifiers 42 and 44 are coupled to a phase shifter 46 which provides, at its output, multiple, phase-shifted AC replica signals which, aside from being phase shifted, are preferably substantially identical to the output signal of the sense amplifier 32. Preferably, the phase difference between successive ones of the replica signals produced at successive outputs of the phase shifter 46 is constant.

In the illustrated embodiment, the phase shifter 4 provides five replica output signals which are each phase shifted by a multiple of 30° so that replica signals are provided at phase differences of 30°, 60°, 90°, 120° and 150° relative to the non-phase shifted or 0° signal provided at the output of the non-inverting amplifier 44. In further accordance with one aspect of the invention, the high speed converter 34 further includes a plurality of splitter/inverter circuits 48, 50, 52, 54 and 56 which are coupled to the outputs of the phase shifter 46 and which each develop, in addition to a non-inverted, non phase shifted, output signal, a plurality of additional AC replica signals which are each 180° out of phase with the associated phase shifter output signal. In the illustrated embodiment, additional AC replica signals are provided at phases of 210°, 240°, 270°, 300° and 330° relative to the 0° signal appearing at the output of the non-inverting amplifier 44. Thus, in response to the AC signal applied from the output of the sense amplifier 32, the high speed converter 34 develops a total of twelve AC replica signals at 30° phase intervals beginning at 0° and ending at 330°. It will be appreciated, however, that in other embodiments, a greater or lesser number of AC replica signals can be developed.

As further illustrated in FIG. 2, each of the twelve phase shifted AC replica signals is applied to an input of a multiple input absolute value amplifier 58. The absolute value amplifier 58 provides, at its output 60, an output voltage substantially proportional in magnitude to the instantaneous magnitude of the one of the twelve replica AC input voltages having greatest magnitude at any instant. Accordingly, the output of the absolute value amplifier 58 will substantially follow the peak values of successive ones of the phase shifted input replica AC voltages and will comprise, substantially, a DC voltage having thereon superimposed an AC ripple signal having a frequency of twelve times the frequency of the input signal to the sense amplifier 32. Because, in the illustrated embodiment, the phase difference of each of the twelve replica AC input voltages is only 30°, the amplitude of the ripple component is relatively small and the output of the absolute value amplifier 58 comprises a substantially DC output voltage indicative of the magnitude of the AC signal sensed by the sense amplifier 32 and, thus, indicative of the magnitude of the sensed line current. Furthermore, because the ripple component is small, no additional filtering is required, and the need for discrete inductive and capacitive filtering components, which give rise to long time constants and sluggish response of the output voltage to changes in the AC input signal, is eliminated. In this manner, the high speed converter 34 provides a DC output voltage which changes quickly in response to changes in the AC input voltage.

Figure 3:
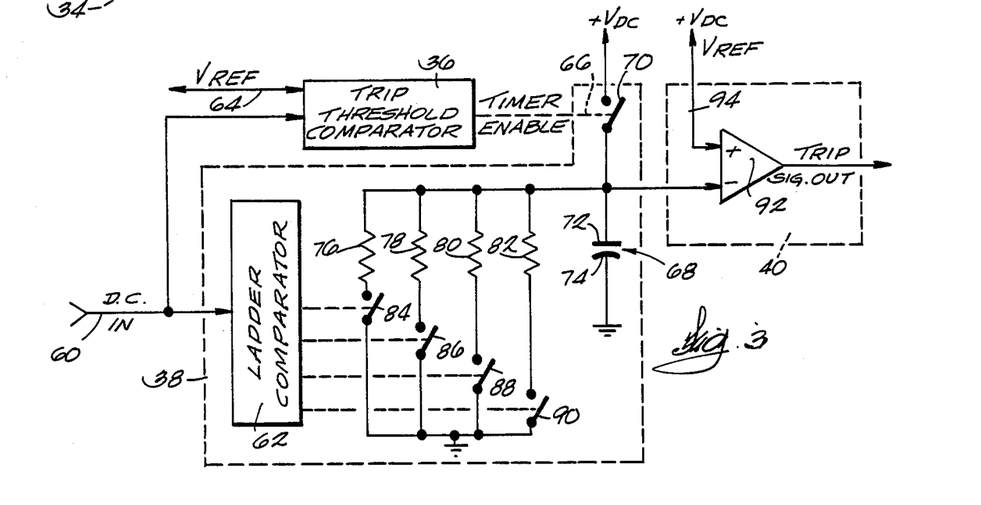
FIG. 3 is a simplified functional block diagram of a voltage to time control circuit as utilized in the line current to time interpolator shown in FIG. 1.

The operation of the voltage to time control circuit 38 can best be understood by reference to the simplified block diagram of FIG. 3. As illustrated, the control circuit 38 includes a ladder voltage comparator 62 to which the DC output 60 of the absolute value amplifier 58 is applied. The ladder comparator 62 compares the DC input voltage to a plurality of differing reference thresholds and then generates a plurality of outputs indicative of whether the DC input voltage is higher than, or lower than, specific individual ones of the reference threshold voltages. Preferably, the reference threshold voltages are set to some specific multiple of the minimum threshold voltage level (e.g., 100% minimum, 200% minimum, 300% minimum etc.) so that each threshold represents a line current magnitude at some multiple of the desired trip current level (e.g., 1× trip current, 2× trip current, 3× trip current etc.)

The DC output voltage of the absolute value amplifier 58 is also applied to the trip threshold comparator 36 as is a single, additional, reference voltage 64 which comprises the aforementioned minimum threshold voltage level. The trip threshold comparator 36 compares the DC output voltage of the absolute value amplifier 58 to the minimum threshold voltage level and develops a timer enable output 66 when the DC output of the absolute value amplifier 58 exceeds the minimum threshold voltage.

As further illustrated in FIG. 3, the control circuit 38 includes a timing capacitor 68 which is coupled through a switch 70 to a source of reference potential such as the supply voltage provided by the power supply. When closed, the switch 70 connects one plate 72 (the positive polarity plate) of the capacitor to the DC supply voltage while the other plate 74 (the negative polarity plate) of the capacitor is connected directly to circuit ground. This has the effect of charging the capacitor 68 and keeping the capacitor charged to the supply voltage so long as the switch 70 remains closed. Closure of the switch 70, in turn, is controlled by means of the trip threshold comparator 36. So long as the DC input voltage remains lower than the minimum threshold voltage supplied to the trip threshold comparator 36, the switch 70 remains closed and the capacitor 68 remains fully charged. Once the DC input voltage reaches or exceeds the minimum threshold voltage, the trip threshold comparator 36 opens the switch 70 to uncouple the capacitor 68 from the supply voltage and thereby permit the capacitor 68 to begin discharging. If the DC input voltage thereafter drops below the minimum threshold voltage, as might occur during overcurrent conditions of short duration, the trip threshold comparator 36 closes the switch to recharge the capacitor 68 and thereby disable the voltage to time control circuit 38.

The rate at which the capacitor 68 discharges is controlled by means of a plurality of resistances 76, 78, 80 and 82 which can be selectively connected, through individual switches 84, 86, 88 and 90, to provide one or more discharge paths across the charged capacitor 68. In the simplified diagram of FIG. 3, four such resistances and switches are shown. In a preferred embodiment, a total of fifteen individual discharge paths can be selectively provided. It will be appreciated, however, that any number of such resistances and switches can be provided.

Operation of the individual switches 84–90 is controlled by means of the ladder comparator 62. In particular, the ladder comparator 62 and switches 84–90 are arranged so that, when the DC input voltage reaches or exceeds a particular one of the multiple reference voltages supplied to the ladder comparator 62, an associated particular one of the switches 84–90 will close to couple the associated resistor 76, 78, 80 or 82 across the charged capacitor 68. This provides a discharge path operable to begin discharging the capacitor 68 at a rate determined by the capacitance of the capacitor and the total resistance of the discharge path. As the DC input voltage increases, more and more of the switches 84, 86, 88 or 90 close to provide additional discharge paths. Expressed differently, closure of additional switches reduces the overall resistance of the discharge path in inverse relationship to the magnitude of the applied voltage so that the capacitor 68 discharges at a faster rate with increasing input voltage. It will be appreciated that so long as the DC input voltage is less than the minimum threshold voltage 64 applied to the trip threshold comparator 36, (indicating a line current magnitude of less than the trip current level) the switch 70 will remain closed and the capacitor 68 will remain coupled to the DC supply voltage. Thus, unless the DC input voltage exceeds the minimum threshold voltage, the capacitor 68 cannot begin discharging, and the circuit acts as a "watchdog" awaiting the occurrence of an overcurrent condition.

As further illustrated in FIG. 3, the positive polarity plate 72 of the capacitor 68 is also coupled to the inverting input of an operational amplifier 92 operating as a voltage comparator within the trip signal generator 40. A trip signal reference voltage 94 is applied to the non-inverting input of the amplifier 92 so that the output of the amplifier 92 will be low whenever the charge voltage of the capacitor 68 exceeds the trip signal reference voltage 94, and will be high whenever the charge voltage of the capacitor 68 drops below the trip signal reference voltage 94. The trip signal reference voltage 94 is selected to be less than the maximum voltage to which the capacitor is charged but more than zero volts. Thus, a low to high voltage transition will be developed at the output of the amplifier 92 when the capacitor discharges to substantially the trip signal reference voltage 94. Assuming the trip signal reference voltage remains constant, the delay between opening of the switch 70 and generation of the low to high voltage transition will be determined by the rate at which the capacitor 68 discharges. As previously described, the discharge rate, in turn, is inversely related to the magnitude of the DC input voltage. Thus, it will be seen that the delay between opening of the switch 70 and generation of the low to high logic transition will be dependent upon the magnitude of the DC input voltage, which, in turn, is dependent upon the magnitude of the sensed line current.

Figure 4A:
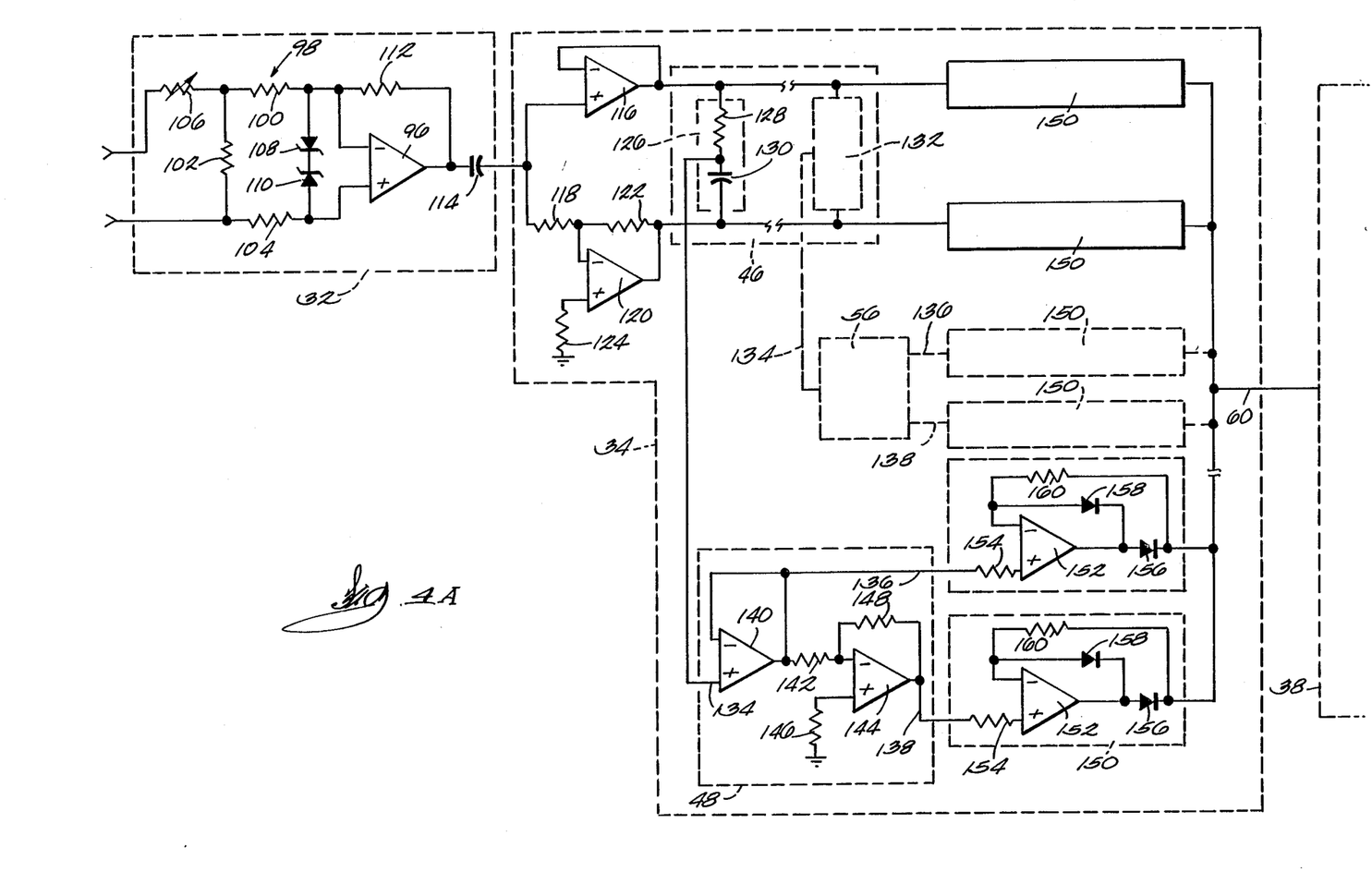
FIGS. 4a and 4b are simplified electrical schematic diagrams of the line current to time interpolator shown in FIG. 1.
Figure 4B:
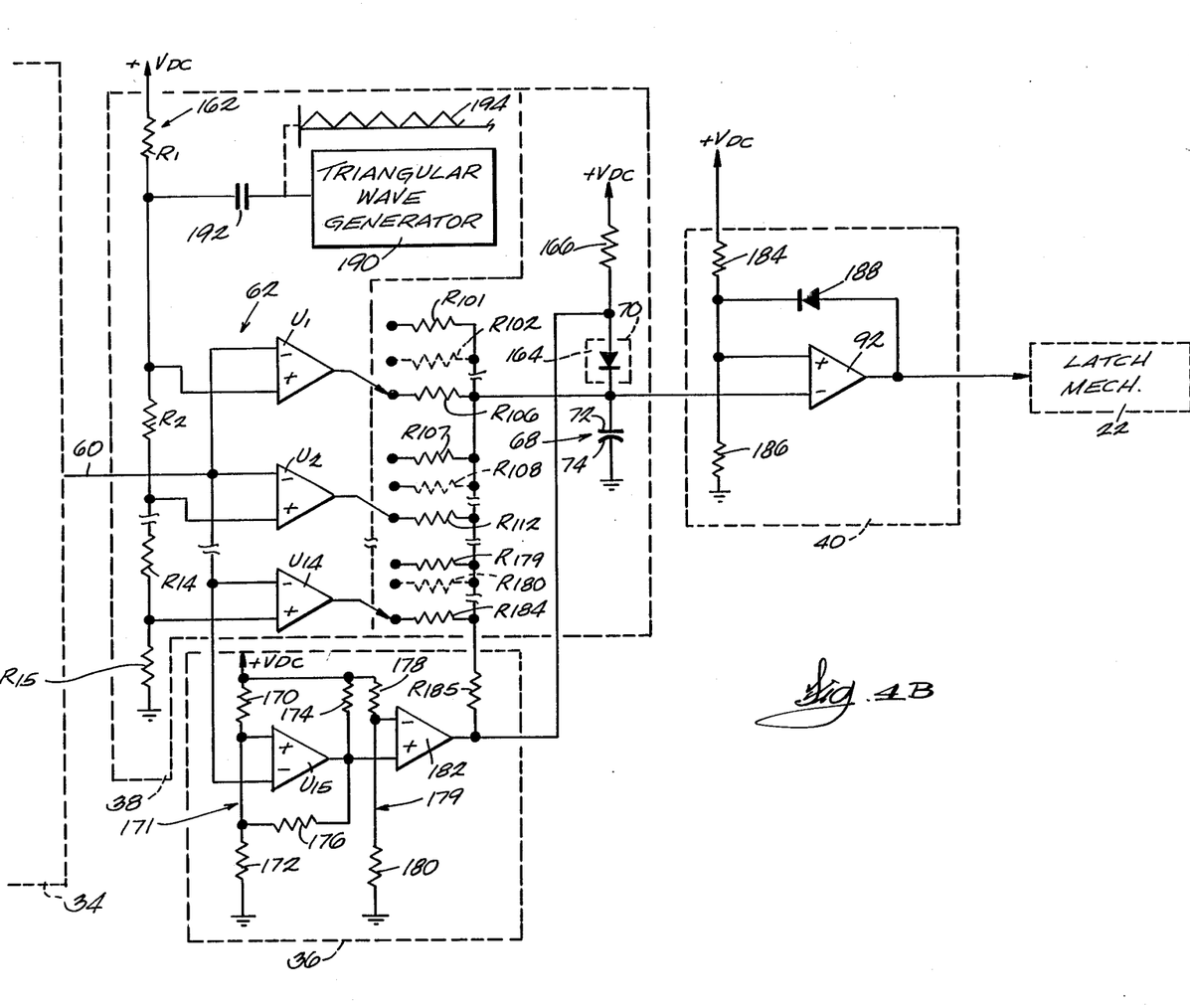

Referring to the schematic diagram of FIGS. 4a and 4b, the sense amplifier 32 includes a differential operational amplifier 96 coupled through an attenuator circuit 98 to the sensing current transformer 28 (FIG. 1). The attenuator 98 includes three serially connected resistors 100, 102 and 104 connected between the inverting and non-inverting inputs of the amplifier 96 and further includes a variable resistance 106 having one end connected to the juncture of the resistors 100 and 102. The other end of the variable resistance 106 is connected to one side of the sensing current transformer 28, and the remaining side of the current transformer 28 is coupled to the juncture of the resistors 102 and 104. The magnitude of the signal applied to the inputs of the differential operational amplifier 96 can be adjusted by varying the resistance of the variable resistor 106. This, in turn, permits adjustment of the trip current level at which the line current to time interpolator functions to interrupt the line current.

To provide protection against high voltage transients, a pair of back-to-back Zener diodes 108 and 110 are connected across the inputs of the differential operational amplifier 96. Preferably, the break-down voltage of each Zener diode 108 and 110 is selected so that voltages greater than the anticipated maximum input signal voltage are shunted through the diodes. Feedback is provided by means of a resistor 112 connected between the output of the differential operational amplifier 96 and the inverting input.

To reduce amplifier offset errors, the output of the sense amplifier 32 is capacitively coupled through a capacitor 114 to the input of the high speed converter circuit 34. The output of the sense amplifier 32 is applied to the non-inverting input of a first unity gain amplifying stage 116 and through a resistor 118 to the inverting input of a second unity gain amplifying stage 120. As illustrated, the output of the first amplifying stage 116 is coupled to the inverting input of the first stage 116, and the output of the second amplifier stage 120 is coupled through a resistor 122 to the inverting input of the second stage 120. The non-inverting input of the second amplifier stage 120 is coupled through a resistor 124 to circuit ground.

When connected as shown, the outputs of the first and second amplifying stages 116 and 120 are 180° out of phase with respect to each other. As further illustrated in FIG. 4a, the outputs of the first and second amplifying stages 116 and 120 are connected to the inputs of a first phase shifting network 126 comprising a series connected resistor 128 and capacitor 130. The signal appearing at the juncture of the resistor 128 and capacitor 130 is phase shifted by an amount determined by the respective values of the capacitor and resistor. Additional ones 132 of such phase shifting networks can be added so as to derive additional AC replica signals at additional phase intervals. In the illustrated embodiment, a total of five such phase shifting networks, providing phase shifts of 30°, 60°, 90°, 120° and 150°, are included and are each connected across the outputs of the first and second amplifier stages 116 and 120. For simplicity, only the first and fifth phase shifting networks are shown in FIG. 4a. In one embodiment of the invention, each capacitor 130 had a value of 0.1 microfarads, and the resistors had values of 7.1 kOhm, 15.3 kOhm, 26.5 kOhm, 45.9 kOhm and 99 kOhm to give phase shifts of 30°, 60°, 90°, 120° and 150° respectively.

The phase shifted replica AC signals provided by the five phase shifter networks 130-132 are applied to the inputs of the five splitter/inverter circuits 48-56. Again, for simplicity, only the splitter/inverter circuit 48 is shown in detail and it is to be understood that each of the four remaining splitter/inverter circuits 50-56 can be identical in construction and operation to the one shown.

Each splitter/inverter circuit 48-56 includes an input 134, a non-inverting output 136, and an inverting output 138. Signals applied to the splitter/inverter 48 are applied to the non-inverting input of a first operational amplifier 140 having its output directly connected to its inverting input. The output of the first operational amplifier 140 is also coupled to the non-inverting output 136 of the splitter/inverter 48 and, through a resistor 142, to the inverting input of a second operational amplifier 144 having its non-inverting input coupled through a resistor 146 to circuit ground and its output coupled through a resistor 148 to its inverting input. The output of the second operational amplifier 144 is also connected to the inverting output 138 of the splitter/inverter 48. Preferably, each operational amplifier 140 and 144 provides unity gain so that the signal provided at the non-inverting output 136 of the splitter/inverter 48 is substantially identical in magnitude, shape, and phase to the signal applied to the input 134, and so that the signal provided at the inverting output 138 is substantially identical to the signal applied to the input 134 except for a substantially 180° phase shift. It will be appreciated that each of the splitter/inverter circuits 48-56 thus functions to provide a pair of oppositely phased output signals in response to each phase-shifted input signal. Accordingly, a total of twelve AC replica signals, at 30° phase intervals, are generated by the five splitter/inverters 48-56 and the two outputs of the inverting and non-inverting amplifiers 120 and 116.

As further illustrated in FIG. 4a, both outputs of each splitter/inverter 48-56 are applied to individual, parallel connected, absolute value amplifier stages 150. In the illustrated embodiment, a pair of such absolute value amplifier stages 150 are provided for each of the five splitter/inverter circuits 48-56, and an additional pair of such absolute value amplifier stages are connected directly to the outputs of the inverting and non-inverting amplifier stages 120 and 116. Thus, in the preferred embodiment, a total of twelve absolute value amplifier stages 150 are provided. The outputs of the twelve absolute value amplifier stages 150 are connected to a common output 60.

As illustrated, each absolute value amplifier stage 150 includes an operational amplifier 152 having a non-inverting input coupled through a resistor 154 to either the inverting or non-inverting output 138 or 136 of the previous splitter/inverter 48–56. The output of each operational amplifier 152 is connected to the anode of a first diode 156 whose cathode is connected to the common output 60 of the high speed converter 34, and to the cathode of a second diode 158 whose anode is connected to the inverting input of the operational amplifier. A resistor 160 is connected between the inverting input of the operational amplifier 152 and the cathode of the first diode 156.

In operation, the output of each of the twelve operational amplifiers 152 follows the peak value of the applied AC replica signal. However, because the output of each operational amplifier 152 is coupled to the common output 60 through a diode 156, the output of an individual one of the amplifiers 152 will actually appear at the common output 60 only if the associated diode 156 is forward biased. Furthermore, because the cathodes of the diodes 156 are connected to one another, an output voltage, appearing at the output of one of the operational amplifiers 152 and sufficient to forward bias one of the diodes 156 will cause substantially the same voltage to be applied to the cathodes of the remaining diodes 156. These diodes will be reverse biased unless their anode voltages exceed the common cathode voltage, in which case the newly forward biased diode now establishes a common cathode voltage for all the other diodes 156. As a result, only one of the diodes 156 can be forward biased at any instant, and that diode is the one connected to the operational amplifier 152 having the greatest output at any instant. Thus, the instantaneous output voltage at the output 60 of the high speed converter circuit 34 is substantially equal to the instantaneous magnitude of the one of the twelve applied AC replica signals having greatest magnitude at any instant.

The output 60 of the high speed converter circuit 34 is directly coupled to the input of the voltage to time control circuit 38. As illustrated in FIG. 4b, the voltage to time control circuit 38 includes a ladder voltage comparator 62 having a plurality of individual comparators and a resistor network 162 for developing, and applying to the comparators, a plurality of distinct voltage thresholds. In the preferred embodiment, a total of fourteen such comparators $U_1-U_{14}$ are included in addition to a fifteenth comparator $U_{15}$ forming a part of the trip threshold comparator circuit 36. However, for simplicity, only three such comparators $U_1$, $U_2$, and $U_{14}$ (in addition to the fifteenth comparator $U_{15}$) are illustrated and it is to be understood that the remaining, unillustrated, comparator circuits $U_3-U_{13}$ can be substantially identical to the illustrated comparators.

The resistor network 162 for developing the fourteen reference voltage thresholds comprises fifteen individual resistors $R_1-R_{15}$ serially connected between a source of reference potential, such as the DC supply voltage, and circuit ground. The applied voltage divides across each of the resistors $R_1-R_{15}$ to develop, at each juncture, a unique, substantially constant, reference voltage.

Although, in the illustrated embodiment, the fourteen individual voltage thresholds are developed by means of a fifteen resistor voltage divider, it will be appreciated that in other embodiments, a plurality of voltage divider networks can be included to develop the fourteen threshold potentials. The non-inverting input of each voltage comparator $U_1-U_{14}$ is connected to one of the junctures of the resistors $R_1-R_{15}$ in the voltage divider 162 so that the voltage developed at the particular juncture forms the threshold voltage for the particular comparator. The output of the high speed converter circuit 34 is connected directly to the inverting input of each of the voltage comparators $U_1-U_{14}$ as well as the trip threshold comparator $U_{15}$.

As further illustrated in FIG. 4b, the voltage to time control circuit 38 further includes the timing capacitor 68 having one plate 74 connected directly to circuit ground and another, positively charged plate 72, coupled, through a forward biased diode 164 and a series resistor 166, to a source of reference potential such as the DC power supply.

The positive polarity plate 72 of the capacitor 68 is also coupled to one side of a plurality of resistors $R_{101}-R_{184}$ which are arranged in groups associated within each of the voltage comparators $U_1-U_{14}$. Preferably, six resistors are included with each group associated with a particular one of the comparators although, for the sake of clarity, some of the resistors are not shown in the diagram of FIG. 4b. The output of each comparator $U_1-U_{14}$ can be connected, through a ganged switch 168, to the remaining end of a single one of the resistors $R_{101}-R_{184}$ in each of the groups so that the positive polarity plate 72 of the capacitor 68 is coupled through an individual one of the resistors in each group to the output of each of the fourteen comparators $U_1-U_{14}$.

As further illustrated in FIG. 4b, the trip threshold comparator circuit 36 includes a resistor voltage divider 171 comprising a pair of resistors 170 and 172 serially connected between the supply voltage and circuit ground. The juncture of the resistors 170 and 172 is connected to the non-inverting input of the fifteenth comparator $U_{15}$, and the inverting input of the comparator is directly connected to the output 60 of the high speed converter circuit 34. The output of the comparator $U_{15}$ is coupled through a resistor 174 to the supply voltage and through an additional resistor 176 to the inverting input of the comparator $U_{15}$. The trip threshold comparator 36 further includes a second resistor voltage divider 179 comprising a pair of resistors 178 and 180 serially connected between the supply voltage and circuit ground and further includes a comparator 182. The inverting input of the comparator 182 is connected to the juncture of the resistors 178 and 180, and the output of the comparator $U_{15}$ is applied to the non-inverting input of the comparator 182. The output of the comparator 182 is coupled through a resistor $R_{185}$ to the positive polarity plate 72 of the capacitor 68, and is directly connected to the anode of the diode 164. Although, for clarity, only a single resistor is shown, resistor $R_{185}$ preferably comprises a plurality (e.g. six) individual resistors which can be individually selected by means of an additional switch section included in the ganged switched 168.

During operation, the first voltage divider 171 functions to establish the predetermined minimum threshold voltage level which is applied to the non-inverting input of the comparator $U_{15}$. When the output of the high speed converter circuit 34 is less than the predetermined minimum threshold voltage, the output of the comparator $U_{15}$ is high and is substantially equal to the DC supply voltage. The high output of the comparator $U_{15}$ causes the output of the comparator 182 to also go high, which, in turn, forward biases the diode 164 and permits the capacitor 68 to charge to substantially the DC supply voltage. So long as the output of the comparator 182 remains high, the positive polarity plate 72 of the capacitor 68 will be tied to the DC voltage supply so that the capacitor voltage is substantially equal to the DC supply voltage.

When the output of the high speed converter circuit 34 reaches or exceeds the predetermined minimum threshold voltage, the output of the comparator $U_{15}$ drops to substantially zero volts causing the output of the operational amplifier 182 to do the same. This causes the voltage at the anode of the diode 164 to go low which, in turn, reverse biases the diode 164 and effectively uncouples the capacitor 68 from the DC voltage supply. When so uncoupled, the capacitor 68 is permitted to discharge through any available discharge path. Thus, it will be appreciated that the trip threshold comparator 36 functions to enable the voltage to time control circuit 38 by reverse biasing the diode 164 when the output voltage of the high speed comparator 34 exceeds the predetermined minimum threshold voltage.

Once enabled, the voltage to time control circuit 38 functions to provide a discharge path across the capacitor 68 and to vary the overall resistance of the discharge path in accordance with the voltage at the output of the high speed converter circuit 34. In particular, as the voltage at the output of the converter 34 rises above the individual threshold voltages established by the resistor divider network 162, the outputs of the comparators $U_1$–$U_{14}$ coupled to the individual threshold voltages sequentially go low. This has the effect of coupling, to circuit ground, the end of the resistors $R_{101}$–$R_{184}$ connected, through the switch 168, to the outputs of the comparators $U_1$–$U_{14}$ and effectively establishes a discharge path through the resistors across the charged capacitor 68. Because the individual threshold voltages provided by the resistor network 162 are all different, a high voltage at the output of the high speed converter 34 will cause more of the fourteen voltage comparators $U_1$–$U_{14}$ to couple their associated resistors $R_{101}$–$R_{184}$ to ground than when the output voltage is lower. This in turn, has the overall effect of reducing the overall discharge resistance across the capacitor 68 which causes the capacitor to discharge at a faster rate than when the output voltage of the high speed converter 34 is lower, and fewer of the comparators couple their associated resistors to ground. Accordingly, it will be appreciated that the discharge rate of the capacitor 68 is inversely related to the magnitude of the voltage at the output of the high speed converter 34.

The trip signal generator 40 is coupled to the positive polarity plate of the capacitor 72 and functions to provide a control effect when the degree of charge of the capacitor 68, as indicated by the capacitor voltage, falls below the predetermined trip signal threshold. In particular, the trip signal generator 40 includes an operational amplifier 92 having its inverting input connected to the positive polarity plate 72 of the capacitor 68 and having its non-inverting input connected to the juncture of a pair of resistors 184 and 186 serially connected between a source of reference potential, such as the DC supply voltage, and circuit ground. The non-inverting input of the operational amplifier 92 is also connected to the cathode of a diode 188, the anode of which is connected to the operational amplifier's output. The values of the resistors 184 and 186 are selected so that the voltage at the non-inverting input of the operational amplifier 92 is less than the maximum voltage to which the capacitor 68 charges when the series diode 164 is forward biased. When the voltage to time control circuit 38 is enabled, and the capacitor 68 begins discharging through the various resistors $R_{101}$–$R_{185}$ coupled across the capacitor 68, the capacitor voltage drops until it reaches the threshold voltage established by the resistor pair 184 and 186 unless the trip threshold comparator 36 disables the voltage to time control circuit 38 before the capacitor 68 discharges to this threshold voltage. When the capacitor discharges to the threshold voltage, the output of the operational amplifier 92 undergoes a low to high voltage transition which can be utilized to trigger the latch mechanism 22 and actuate the circuit interrupters 18 and 20.

In accordance with one aspect of the invention, the voltage to time control circuit 38 is arranged so as to provide interpolation between the discrete threshold voltages established by the resistor network 162. By this is meant that, when the output voltage of the high speed converter 34 falls between a pair of individual reference voltages established by the resistor divider 162, the time delay between enablement of the voltage to time control circuit 38 and development of the trigger pulse to the magnetic latch 22 will fall between the time delays provided when the output voltage of the high speed converter 34 substantially equals either of the two reference voltages. To this end, voltage generating means are provided for varying the individual threshold voltages applied to the non-inverting inputs of the voltage comparators $U_1$–$U_{14}$.

In the illustrated embodiment, such means comprises a triangular-wave generator 190 of known construction and having an output coupled through a capacitor 192 to the resistor divider network 162. The triangular-wave generator 190 generates a triangularly shaped voltage waveform 194, and the capacitor 192 is preferably connected to the resistor divider 162 at the juncture of the first and second resistors $R_1$ and $R_2$.

As illustrated, the voltage waveform 194 developed at the output of the triangular-wave generator 190 rises and falls linearly with respect to time. The triangularly shaped voltage waveform 194 is superimposed on the constant DC voltage applied to the resistor network 162 and causes the individual reference or threshold voltages, developed at the junctures of the resistors $R_1$–$R_{15}$ and applied to the non-inverting inputs of the comparators $U_1$–$U_{14}$, to also rise and fall linearly with respect to time. Thus, it will be appreciated that the reference voltage applied to the non-inverting input of each of the comparators $U_1$–$U_{14}$ is not constant but varies over a range between a maximum value and a minimum value. Preferably, the magnitude of the triangularly shaped voltage waveform 194 developed at the output of the triangular-wave generator 190 is such that the reference voltage developed at the juncture of any two resistors in the resistor network 162 varies between a minimum valve substantially equal to the maximum voltage of the next lower threshold voltage, and a maximum value substantially equal to the minimum voltage of the next higher reference voltage. Thus, the reference voltage applied to the non-inverting input of each of the comparators U1–U14 is not constant but, rather, varies so as to establish a voltage threshold "window" within which a fixed voltage, applied to the inverting input of the comparator, will enable, at least temporarily, the comparator. How long the comparator remains enabled is determined by what percentage of time the voltage at the output 60 of the high speed converter 34 and applied to the inverting input of the comparator remains greater than the varying reference voltage applied to the non-inverting input of the comparator. Thus, for example, in the event the voltage applied to the inverting input of a comparator exceeds the varying threshold voltage applied to the non-inverting input of the comparator during 80% of each cycle of the triangularly shaped voltage waveform 194, the comparator will be enabled during 80% of each cycle and disabled during the remaining 20%.

In the illustrated embodiment, the DC voltage appearing at the output 60 of the high speed AC to DC converter 34 is coupled to the inverting inputs of the comparators $U_1-U_{14}$. To the extent that the DC voltage appearing at the output 60 of the high speed converter 34 exceeds individual ones of the individual, varying reference voltages applied to the non-inverting inputs of the comparators $U_1-U_{14}$, those comparators will be enabled and will establish individual discharge paths for the capacitor 68. If the voltage at the output 60 is sufficiently high to exceed the varying reference voltage applied to an individual comparator over the entire cycle of the triangularly shaped voltage waveform 194 developed by the triangular-wave generator 190, that comparator will remain enabled continuously. Similarly, those comparators, for which the varying reference voltages exceed, at all times, the voltage developed at the output 60 of the high speed AC to DC converter 34, will remain continuously disabled. However, for one of the comparators, the voltage at the output 60 will be such that it falls between the maximum and minimum voltages attained by the varying threshold voltage applied to the comparator's non-inverting input. Under such circumstances, the comparator will be enabled for so long as the output voltage exceeds the varying reference voltage and will be disabled for so long as the output voltage is less than the varying reference voltage. This comparator will thus operate to alternately create and destroy and an additional discharge path across the capacitor 68. In addition, the percentage of time that the additional discharge path is thus created is dependent upon the percentage of time that the output voltage exceeds the varying reference voltage applied to the comparator. Accordingly, the voltage to time control circuit 38 functions to interpolate between the reference voltages applied to the individual voltage comparators $U_1-U_{14}$ so that the relationship between the DC voltage provided at the output of the high speed AC to DC converter 34 and the delay provided by the voltage to time control circuit 38 is smoothly continuous rather than step-like in form.

It will be appreciated that, as connected, the trip signal generator 40 develops the low to high voltage transition output pulse after a delay determined by the discharge rate of the capacitor 68. This rate, in turn, is determined by the overall resistance of the discharge path, which is itself controlled by, not only which of the comparators $U_1-U_{15}$ is actuated at any time, but also by which of the resistors $R_{101}-R_{185}$ the outputs of the comparators $U_1-U_{15}$ are coupled to at any time. It will be appreciated that by selecting appropriate values for the individual resistors $R_{101}-R_{185}$, the precise inverse time-current delay provided by the system can be tailored to suit particular needs. In addition, by virtue of the switch 168 connected to the outputs of the individual comparators $U_1-U_{15}$, a plurality of such inverse current-time characteristics can be designed into the overall system and can be selected by means of adjusting the switch position.

While a particular embodiment of the invention has been shown and described, it will be obvious to those skilled in the art that changes and modifications may be made therein without departing from the invention in its broader aspects, and, therefore, the aim in the appended claims is to cover all such changes and modifications as fall within the true spirit and scope of the invention.

We claim:

1. A high speed converter circuit for developing a DC voltage indicative of the magnitude of an applied AC voltage, said converter circuit comprising:
    phase shifter means for developing a plurality of replica AC voltages similar to the applied AC voltage and differing in phase from one another; and
    absolute value amplifier means coupled to said phase shifter means for developing an output voltage substantially proportional to the magnitude of the one of said replica AC voltages having greatest magnitude at any instant.

2. A high speed converter circuit in accordance with claim 1 wherein the phase difference between successive ones of said replica AC voltages is substantially constant.

3. A high speed converter circuit in accordance with claim 2 wherein one of said replica AC voltages is substantially in phase with said applied AC voltage.

4. A high speed converter circuit in accordance with claim 3 wherein said phase shifter means provides six of said replica AC voltages and wherein successive ones of said six replica AC voltages differ in phase by substantially 30°.

5. A high speed converter circuit in accordance with claim 1 wherein said phase shifter means includes inverter means for inverting one or more of said replica AC voltages to develop thereby additional replica AC voltages similar to the applied AC voltage and differing in phase from one another.

6. A high speed converter circuit in accordance with claim 5 wherein the phase difference between successive ones of said replica AC voltages and said additional replica AC voltages is substantially constant.

7. A high speed converter circuit in accordance with claim 6 wherein said inverter means includes a non-inverting amplifier and an inverting amplifier and wherein the output of said non-inverting amplifier is coupled to the input of said inverting amplifier and said additional replica AC voltage is produced at the output of said inverting amplifier.

8. A high speed converter circuit in accordance with claim 7 wherein said converter circuit includes a plurality of said inverting means and wherein said absolute value amplifier means includes a first plurality of absolute value amplifiers having inputs coupled to the outputs of said non inverting amplifiers and further includes a second plurality of absolute value amplifiers having inputs coupled to the outputs of said inverting amplifiers.

9. A high speed converter circuit in accordance with claim 8 wherein each of said absolute value amplifiers includes an output and wherein said outputs of said absolute value amplifiers are connected to one another.

10. A control circuit for providing a control effect after a period of delay having a duration inversely related to the magnitude of an applied voltage, said control circuit comprising:
- a source of reference potential;
- a capacitor adapted to be charged from said source of reference potential;
- enabling means responsive to the magnitude of the applied voltage for terminating charging of said capacitor from said source of reference potential when the applied voltage exceeds a predetermined enabling threshold potential;
- comparator means responsive to the magnitude of the applied voltage for providing a discharge path operable to discharge said capacitor and for varying the resistance of said discharge path in inverse relationship to the magnitude of the applied voltage so as to vary the rate of discharge of said capacitor in inverse relationship to the magnitude of the applied voltage; and
- trip generator means responsive to the degree of charge of said capacitor for developing a control effect when the degree of charge of said capacitor falls below a predetermined threshold.

11. A control circuit in accordance with claim 10 wherein said comparator means includes a ladder voltage comparator having a source of multiple, differing, reference threshold potentials, and having a plurality of voltage comparators for independently comparing the applied voltage to each of said reference threshold potentials.

12. A control circuit in accordance with claim 11 wherein said ladder comparator further comprises voltage generating means for periodically varying said threshold potentials so that said comparator means provides interpolation of applied voltages falling between individual ones of said reference threshold potentials.

13. A control circuit in accordance with claim 12 wherein said voltage generating means comprises a triangular wave generator.

14. A control circuit in accordance with claim 11 wherein each of said voltage comparators includes an output coupled through a resistor to said capacitor so that a discharge path is provided to said capacitor through said resistor when the applied voltage exceeds said reference threshold potential applied to said voltage regulator.

15. A control circuit in accordance with claim 14 wherein said source of multiple reference potentials comprises an additional source of reference potential and a plurality of serially connected resistors connected between said additional source of reference potential and circuit ground.

16. A control circuit in accordance with claim 10 wherein said enabling means includes a voltage comparator operable to compare the applied voltage to a reference trigger voltage and to uncouple said capacitor from said source of reference potential when the applied voltage exceeds said reference trigger potential.

17. A control circuit in accordance with claim 16 wherein said capacitor is coupled to said source of reference potential through a serially connected resistor and diode and wherein said enabling means shunts current from the juncture of said resistor and diode to circuit ground when the applied voltage exceeds said reference trigger voltage.

18. An interpolater circuit operable to sense an overcurrent condition in a conductor of a power distribution system and to develop, after a delay period having a duration inversely related to the magnitude of the overcurrent condition, a control effect in response to such an overcurrent condition, said interpolater circuit comprising:
- sensing means responsive to the magnitude of current in a conductor of a power distribution system for developing an AC sense voltage indicative of the magnitude of current in the conductor;
- phase shifter means for developing a plurality of replica AC voltages similar to the sense AC voltage and differing in phase from one another;
- absolute value amplifier means coupled to said phase shifter means for developing an output voltage substantially proportional to the magnitude of the one of said replica AC voltages having greatest magnitude at any instant;
- a source of reference potential;
- a capacitor adapted to be charged from said source of reference potential;
- enabling means responsive to the magnitude of said output voltage for terminating charging of said capacitor from said source of reference potential when said output voltage exceeds a predetermined threshold potential;
- comparator means responsive to the magnitude of said output voltage for providing a discharge path operable to discharge said capacitor and for varying the resistance of said discharge path in inverse relationship to the magnitude of said output voltage so as to vary the rate of discharge of said capacitor in inverse relationship to the magnitude of said output voltage; and
- trip generator means responsive to the degree of charge of said capacitor for developing a control effect when the degree of charge of said capacitor falls below a predetermined threshold.

* * * * *